United States Patent [19]  [11] 4,304,900
O'Neill  [45] Dec. 8, 1981

[54] WATER DISSIPATABLE POLYESTERS

[75] Inventor: George J. O'Neill, Kingsport, Tenn.

[73] Assignee: Eastman Kodak Company, Rochester, N.Y.

[21] Appl. No.: 144,511

[22] Filed: Apr. 28, 1980

[51] Int. Cl.$^3$ .............................................. C08G 63/68
[52] U.S. Cl. .............................. 528/290; 260/29.2 E; 528/291; 528/292
[58] Field of Search ...................... 528/290, 291, 292; 260/29.2 E

[56] References Cited

U.S. PATENT DOCUMENTS 3,546,180 12/1970 Caldwell et al. .................... 528/290
4,145,469 3/1979 Newkirk et al. .................... 428/245
4,156,073 5/1979 Login ................................. 528/295

Primary Examiner—Lucille M. Phynes
Attorney, Agent, or Firm—John F. Stevens; Daniel B. Reece, III

[57] ABSTRACT

Disclosed are linear, water-dissipatable polyesters and polyesteramides derived from at least one dicarboxylic acid, at least one glycol of which at least 85 mole percent is a polyoxyethylene glycol, and a disulfonamido compound. The polyesters may also contain an unsaturated acid and a difunctional hydroxycarboxylic acid, an aminocarboxylic acid or a diamine. Such polymers are especially useful as adhesives, coatings, films, textile sizes and the like.

17 Claims, No Drawings

WATER DISSIPATABLE POLYESTERS

TECHNICAL FIELD

This invention relates to water-dissipatable polyesters and polyesteramides wherein at least a part of one of the monomeric components from which it is derived is a disulfonamido compound. These polymers are useful as adhesives, coatings, films, textile sizes and the like.

BACKGROUND ART

Water-dissipatible polyesters and polyesteramides are known in the art. For example, U.S. Pat. No. 3,734,874 relates to such polymers prepared by reacting a glycol component, a dicarboxylic acid component, and at least one difunctional comonomer wherein a portion of the comonomer contains a sulfonate group in the form of a metallic salt, the sulfonate salt group being attached to an aromatic nucleus. At least a part of the glycol component of the polymer is a polyethylene glycol.

Another patent of interest is U.S. Pat. No. 3,546,180, which discloses disulfonamido compounds incorporated into polyester molecules for improving the dyeability of polyester shaped articles such as fibers and films. Other patents of interest include U.S. Pats. No. 3,563,942, 3,546,008; 4,073,77 and 4,104,262, and Research Disclosure No. 18,569 of September, 1979. These patents do not, however, disclose polyesters and polyamides containing disulfonamido compounds which are water-dissipatable.

DISCLOSURE OF INVENTION

This invention provides a linear water-dissipatable polymer having carbonyloxy interconnecting groups in the structure in which up to 75% may be carbonylamido linking groups. This polymer has an inherent viscosity of at least 0.1 and preferably at least 0.3 and comprises the following:

(1) at least one dicarboxylic acid, (2) at least one glycol, at least 85 mole percent of which is a polyoxyethylene glycol having a molecular weight of about 100 to about 1000, and (3) an amount sufficient to provide the polymer at least water-dissipatable, dispersible, or soluble of at least one polycarboxylic acid containing a disulfonamido ion which is bound to a hydrogen ion, an alkali metal ion, a divalent metal ion such as alkaline earth metals, lead, iron, etc., a nitrogen-based cation such as an ammonium ion or mixtures thereof.

In addition, the polymer may contain an unsaturated mono- or dicarboxylic acid and/or from none to an amount of a difunctional hydroxycarboxylic acid having one —CR$_2$OH group, an aminocarboxylic acid having one —NRH group, a diamine having two —NRH groups, or a mixture thereof, where each R is an H atom or a 1-4 carbon alkyl group.

Acids which may be used include the aliphatic dibasic acids or esters thereof of the formula $$R^{10}OOC—R^{11}—COOR^{12}$$

wherein $R^{10}$ and $R^{12}$ are either hydrogen or alkyl radicals containing from 1 to 10 carbon atoms, and $R^{11}$ is an aliphatic hydrocarbon radical. Typical aliphatic dibasic dicarboxylic acids which can be employed include oxalic acid, succinic acid, adipic acid, sebacic acid, α,α-dimethyl glutaric acid, dimethyl malonic acid diglycollic acid, β-oxydipropionic acid, -oxydibutyric acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

Aromatic dicarboxylic acids or diesters thereof may be advantageously used. Such acids have the formula $R^{10}OOCR^{13}—Y—R^{14}COOR^{12}$ wherein $R^{10}$ and $R^{12}$ are the same as defined above and $R^{13}$ and $R^{14}$ each represents $(—CH_2—)_{n-1}$ wherein n has a value of from 1 to 5 inclusive and Y represents a divalent aromatic radical of the formula

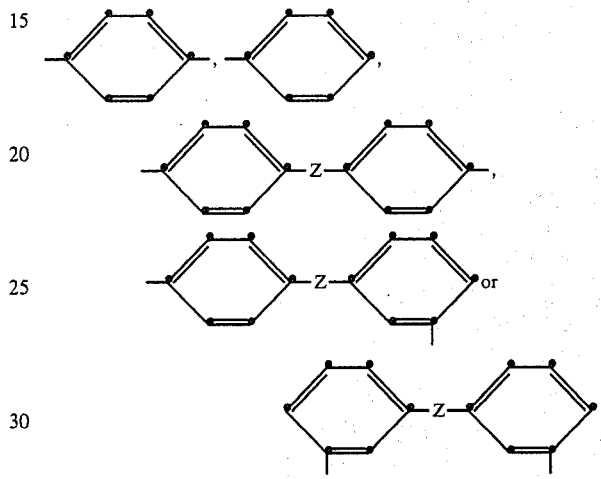

Z representing a radical of the formula

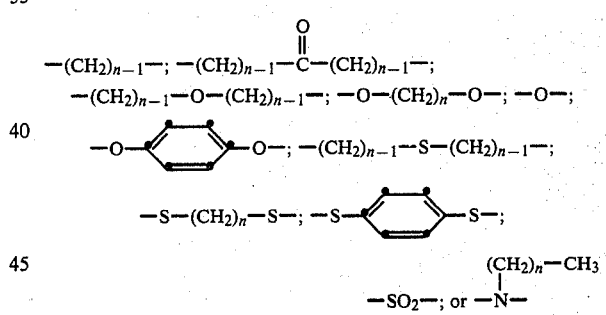

Examples of such acids include p,p'-sulfonyldibenzoic acid, 2,7-naphthalene dicarboxylic acid, terephthalic acid, 1,2-di(p-carboxyphenoxy)ethane, 1,2-di(p-carboxyphenyl)ethane, 1,2-di(p-carboxyphenoxy)ethane and p,p-di-phenic acid. The preferred acid is isophthalic acid.

It should be understood that use of the corresponding acid anhydrides, esters, and acid chlorides of these acids is included in the term "dicarboxylic acid". Examples of these esters include dimethyl, 1,4-cyclohexanedicarboxylate; dimethyl 2,6-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

For the glycol component, at least 85 mole percent is a polyoxyethylene glycol (polyethylene glycol) having a molecular weight of from about 100 to about 1000. Examples of suitable poly(ethylene glycols) include diethylene glycol, triethylene glycol, tetraethylene glycol, and pentaethylene, hexaethylene, heptaethylene, octaethylene, nonaethylene, and decaethylene glycols, and mixtures thereof. Preferably the poly(ethylene glycol) employed in the polyesters or polyesteramides of the present invention is diethylene glycol or triethylene glycol or mixtures thereof. The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

Up to 15 mole percent of the glycol component may be glycols having the formula

HO—(CH$_2$)$_n$—OH where n is an integer from 2 to 12.

The disulfonamido compounds are used in the present invention in amounts of from 8 to 20, preferably about 15, mole percent based on the sum of all acid equivalents. They have the general structure:

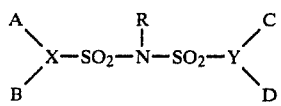

wherein R is —H, an alkali metal, divalent metal or nitrogen-based cation; X and Y are the same or different radicals selected from the group consisting of divalent and trivalent arylene radicals of 6 to about 12 carbons and divalent and trivalent alkarylene radicals of 7 to about 18 carbons, the radicals being unsubstituted or substituted with chlorine atoms; and A, B, C and D are the same or different and selected from the group consisting of —H, —COOR″ and

wherein R″ is alkyl of from 1 to about 8 carbons, or aryl of from 6 to about 14 carbons, R$_1$ is alkyl of from 1 to about 8 carbons, and wherein either two or three of A, B, C, and D are —H.

When the disulfonamido compound contains only one of the radicals A, B, C, and D capable of participating in the esterification reaction, it functions as a chain-terminating agent and limits the molecular weight of the polyester. In order to compensate for this, a branching agent that contains three or more esterifiable groups may be employed.

The disulfonamido containing compounds of the invention are illustrated by the following examples.

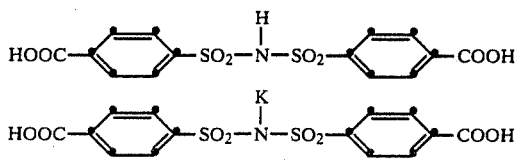

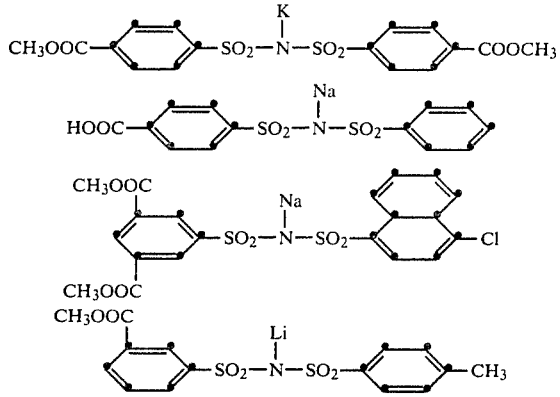

It is well known in the art to prepare di(aryl)sulfonamides by treatment of an aromatic sulfonamide with an aromatic sulfonyl chloride in the presence of an acid acceptor such as an alkali hydroxide [Zhur. Obschei Khim., 29, 3602 (1959)]. [See Chemical Abstracts, 54. 19577.] This method is generally useful in preparing the disulfonamido linkage of the modifiers of the present invention. The carboxy or carbalkoxy groups of the modifiers may be present as substituents on the sulfonamide or sulfonyl chloride before synthesis of the disulfonamido linkage. The carboxy or carbalkoxy groups may also be synthesized after the disulfonamido linkage by oxidation of an α-hydrogen bearing an alkyl group attached to an aromatic ring. This oxidation may be brought about by several inorganic oxidizing agents such as alkaline potassium permanganate, sodium dichromate, chromium trioxide, dilute nitric acid and the like. The reaction may be carried out in aqueous media or in organic solvents such as acetic acid. The oxidation method is particularly useful when the arylene radicals involved are phenylene. The following general equations illustrate the methods for synthesizing the new polyester modifiers.

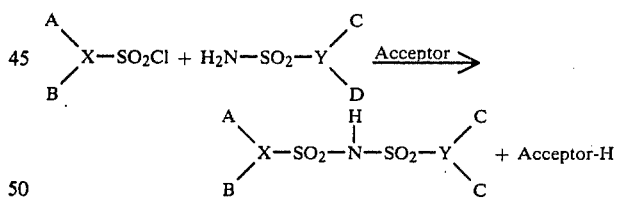

wherein X and Y are the same or different radicals selected from the group consisting of divalent and trivalent arylene radicals of 6 to about 12 carbons and divalent and trivalent alkarylene radicals of 7 to about 18 carbons, the radicals being substituted or unsubstituted with chlorine atoms, A, B, C and D are the same or different and selected from the group consisting of —H, —COOR″ and

wherein R″ is alkyl of from 1 to about 8 carbons, or aryl of from 6 to about 14 carbons, R$_1$ is alkyl of from 1 to about 8 carbons, and wherein either two or three of A, B, C and D are —H.

The acid acceptor may be an alkali hydroxide or tertiary amine such as pyridine. When one or two of the groups A, B, C or D are alkyl with an alpha-hydrogen the groups may be oxidized to carboxyl groups. Although the modifiers have been illustrated here as fully protonated species, they may also be isolated as a monoalkali species.

As has been mentioned above, when the disulfonamido modifier is monofunctional it may be advantageous to use a branching agent in the polyesterification reaction. Such branching agents may contain three or more functional groups and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxyl branching agents include glycerin, trimethylolpropane, pentaerythritol, dipentaerythritol, 1,2,6-hexanetriol and 1,3,5-trimethylolbenzene. Examples of hydroxy acids are 2,2-dihydroxymethyl propionic acid; 10,11dihydroxyundecanoic acid; and 5-(2-hydroxyethoxy)isophthalic acid.

Should crosslinking with another monomer be desired, unsaturated acids may be used to crosslink with the unsaturation in the polyester. For example, an unsaturated acid may be used with a monomer, and a free radical initiating catalyst such as radiation or peroxide may be used. The $\alpha,\beta$-unsaturated acids are described by the following structure:

$$R\text{---}CH\!\!=\!\!CH\text{---}R^1$$

wherein R is H, alkylcarboxy, or arylcarboxy and $R^1$ is carboxy or arylcarboxy. Polymers derived from the above components can be used in combination with polymers derived from other components and/or in combination with other ethylenically unsaturated comonomers (e.g., acrylic acid, acrylamide, butyl acrylate, diacetone acrylamide). The comonomers can be from 1-75 parts by weight, preferably 5-25 parts by weight.

From none to about 30 mole percent of a difunctional hydroxycarboxylic acid having one —CH$_2$—OH group, an aminocarboxylic acid having one —NRH group, 15 mole percent of an amino-alcohol having one —CR$_2$—CH group and one —NRH group and a diamine having two —NRH groups, or a mixture thereof, wherein each R is an H atom or a 1-4 carbon alkyl group may also be included. The components being organic compounds, each of which contains a hydrocarbon moiety which has from none up to six nonfunctional groups, and where (1) the difunctional dicarboxylic acid represents all of the carboxy functional groups in said polymer from all of said components and (2) the difunctional glycol represents all of the functional hydroxy and functional amino groups in the polymer from all of said components, the ratio of (1) to (2) in the polymer is substantially unity, whereby the polymer is essentially linear. According to one aspect of this invention, there is provided a polymer which is a polymer wherein the difunctional sulfoamidemonomer is a dicarboxylic acid and constitutes about 8 mole percent to about 20 mole percent based on the sum of (1) the moles of the total dicarboxylic acid content of components (1) and (2), and (2) one half of the moles of any hydroxycarboxylic acid content from this difunctional hydroxycarboxylic acid component.

Difunctional amide compounds may also be incorporated into the polyester backbone to form polyesteramides, for example, to enhance adhesion to nylon. Advantageous difunctional components which are aminoalcohols include aromatic, aliphatic, heterocyclic and other types. Specific examples include 5-aminopentanol-1,4-aminomethylcyclohexanemethanol, 5-amino-2-ethyl-pentanol-1, 2-(4-$\beta$-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —CR$_2$—OH group.

Such difunctional monomer components which are aminocarboxylic acids include aromatic aliphatic, heterocyclic, and other types and include lactams. Specific examples include 6-aminocaproic acid, its lactam known as caprolactam, omegaaminoundecanoic acid, 3-amino-2-dimethylpropionic acid, 4-($\beta$-aminoethyl)-benzoic acid, 2-($\beta$-aminopropoxy)benzoic acid, 4-aminomethylcyclohexanecarboxylic acid, 2-($\beta$-aminopropoxy)-cyclohexanecarboxylic acid, etc. Generally these compounds contain from 2 to 20 carbon atoms.

Examples of such difunctional monomers which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc. From none, up to about 15 mole percent, based on 100 mole percent acid, of this difunctional component may be used.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight. In addition, whenever the terms "dissipatable," "dissipated" or "dissipate" are used in this description, it will be understood to refer to the activity of a water, aqueous or caustic aqueous solution on the polymer. The terms are specifically intended to cover those situations wherein the solution dissolves and/or disperses the polyester or polyesteramide therein and/or therethrough. Furthermore, whenever the word "water" is used in this description, it includes not only aqueous solutions but also hot aqueous solutions and caustic aqueous solutions.

The polyesters and polyesteramides of this application have particular utility in the coatings, textile finishes and adhesives which will dissipate and can be applied to a substrate in aqueous or caustic aqueous solutions. In many operations, it is advantageous to apply the aqueous solutions and dry the coated substrate. In addition, the present polyesters and polyesteramides have utility as hot-melt adhesives for paper, cloth, polyester film and other substrates. For example, it is possible to apply a water solution of the polymer to a substrate, allow the water to evaporate leaving an adherent coating of the polymer on the substrate.

Additional uses are disclosed in Shields, Hawkins and Wooten U.S. Pat. No. 3,456,008 entitled "Sizing Compositions and Fibrous Articles Sized Therewith."

The polymer containing the required amount of sulfonate group in the form of its alkali metal salt in water is prepared according to known procedures. For example, the sulfonate-containing difunctional monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange reactions as well as polymerization or build-up processes.

In cases where the disulfonamido compound contains a nitrogen-based cation such as the ammonium ion, the alkali metal cation is exchanged for the nitrogen based cation using such conventional methods as by molecular filtration or ultrafiltration at 25° C. In such filtration methods, the polymer may be separated from salts using a membrane through which the liquid is allowed to pass by gravity or by the application of a pressure differential. Separation by the application of pressure is preferred. The pores of the membrane are small enough to retain the polymer, but large enough to allow the salts to pass through. Such methods are well known, and suitable equipment is commercially available, examples of which are referred to herein.

The following examples are submitted for a better understanding of the invention. The polymers are prepared using isophthalic acid, diethylene glycol, and a sodio-monomer identified as follows:

Example 2,3,4 and 8-10

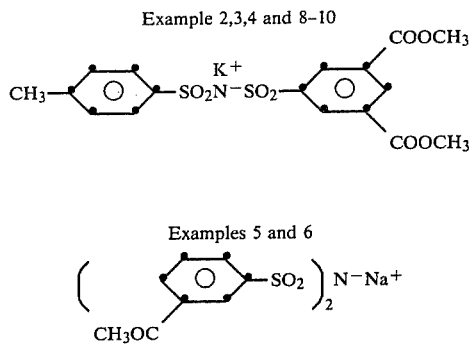

Examples 5 and 6

CH$_3$OC
Examples 7 and 11 - sodiosulfoisophthalate.

EXAMPLE 1

A 500-ml flask is charged with 93.1 g (0.48 mole) dimethylisophthalate, 52.2 g (0.12 mole) dimethyl-3,3'-[(sodioimino-disulfonyl)]dibenzoate, 95.4 g (0.90 mole) diethylene glycol, and 100 ppm Ti as a catalyst based on the weight of the polymer. The flask is equipped with a head having a nitrogen inlet, a take-off to remove volatile materials, and a socket joint to accommodate a stirrer. The stirrer shaft runs through the socket joint and has a ball joint attached by pressure tubing to the shaft to seal the socket joint.

The flask is swept with a slow stream of nitrogen, stirred, and immersed in a metal bath preheated to 200° C. Alcoholysis begins as soon as the contents of the flask are molten. The methanol evolved is swept by the nitrogen stream into a condensing system where it is measured. Heating and stirring occur for 90 minutes at 200° C. and then the temperature of the bath is increased to 220° C. When the bath temperature reaches 220° C. the reaction is held there for 30 minutes and then the bath temperature is increased to 260° C. At 260° C., the nitrogen inlet is closed and a vacuum pump is applied. Within five minutes, a pressure of less than 0.5 mg Hg is attained. Stirring and heating under reduced pressure are continued for 60 minutes. At the end of this time, the flask is removed from the bath and the polymer is recovered by breaking the flask. The inherent viscosity of the polymer is 0.32.

EXAMPLES 2-11

Table 2 summarizes the results of evaluating polyesters as textile sizes for polyester yarns. In Example 8, the size is dispersed in a mixture of equal quantities of water and isopropanol. In Examples 9-11, the size is dispersed in water. In all cases, the polymers containing the disulfoamido monomer have acceptable adhesion and are nontacky. The higher levels of the disulfoamido monomer, i.e., 15-20 versus 10 mole %, have better adhesion to polyester films.

TABLE 1

Selected Polymer Properties and Water Dispersibility of Copolyesters

| Example | % Sulfonamido Monomer as Mole % of Acid | I.V. | Tg (°C.)[2] | Water Dispersibility |
|---|---|---|---|---|
| 2 | 10 | 0.43 | 32 | poor, 100° C.[3] |
| 3 | 15 | 0.31 | 41 | good, 80° C., 10% concentration |
| 4 | 20 | 0.27 | 49 | good, 80° C., 10% concentration |
| 5 | 10 | 0.34 | 33 | fair, 80° C., 10% concentration |
| 6 | 20 | 0.42 | 42 | good, 80° C., 10% concentration |
| 7 | 10 | 0.53 | 23 | good, 80° C., 10% concentration |

[1]Prepared in the melt at about 250° C. using the dimethyl esters of the diacids, diethylene glycol and Ti catalyst
[2]Determined by differential scanning calorimetry
[3]Insoluble in ethylacetate and benzene; soluble in Cl$_2$CHCH$_3$, CH$_2$Cl$_2$, CHCl$_3$

TABLE 2

Properties of Copolyesters as a Textile Size

| Example | % Sulfonamido Monomer as Mole % of Acid | Appearance | Flexibility | Tackiness | Adhesion to Polyester Film Unscored | Scored |
|---|---|---|---|---|---|---|
| 8 | 10 | clear | good | non-tacky | good | poor |
| 9 | 15 | clear | poor | non-tacky | good | good |
| 10 | 20 | clear | poor | non-tacky | good | good |
| 11 | 10 | clear | good | non-tacky | good | good |

Other conventional additives which may be used include plasticizers, stabilizers, dyes, pigments, etc.

Unless otherwise indicated, all parts, percentages, ratios, etc., are by weight.

The invention has been described in detail with particular reference to preferred embodiments thereof, but it will be understood that variations and modifications can be effected within the spirit and scope of the invention.

I claim:
1. A linear, water-dissipatable polyester of

(1) at least one dicarboxylic acid,
(2) at least one glycol, at least 85 mole percent of which is a polyoxyethylene glycol having a molecular weight of about 100 to about 1000, and
(3) from 8 to 20 mole percent of a disulfonamido compound having the structural formula:

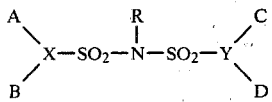

wherein
(a) R is selected from the group consisting of —H, an alkali metal, a divalent metal, and a nitrogen based cation,
(b) X and Y are the same or different radicals selected from the group consisting of divalent and trivalent arylene radicals of 6 to 12 carbons and divalent and trivalent alkarylene radicals of 7 to about 18 carbons, said radicals being unsubstituted or substituted with chlorine atoms, and
(c) A, B, C and D are the same or different and are selected from the group consisting of

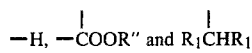

wherein
R″ is selected from the group consisting of —H, alkyl of from 1 to about 8 carbons and aryl of from 6 to about 14 carbons, $R_1$ is alkyl of from 1 to about 8 carbons, and either two or three of A, B, C and D are —H,
said polyester having an intrinsic viscosity of at least 0.1 as measured in a 60/40 mixture of phenol-tetrachloroethane.

2. A linear, water-dissipatable polyester according to claim 1 wherein the acid component of the polyester comprises about 12–18 mole percent of said disulfonanido compound.

3. A linear, water-dissipatable polyester according to claim 1 wherein a major portion of said dicarboyxlic acid is isophthalic acid.

4. A linear, water-dissipatable polyester according to claim 1 wherein said polyoxyethylene glycol is diethylene glycol.

5. A linear, water-dissipatable polyester according to claim 1 comprising from about 1 to about 75 percent unsaturated mono- or dicarboxylic acid based on the total mole percent of the acid.

6. A linear, water-dissipatable polyester according to claim 1 which also contains up to 30 mole percent of a difunctional hydroxycarboxylic acid having one —CH$_2$OH group, an aminocarboxylic acid having one —NRH group, 15 mole percent of an amino-alcohol having one —CH$_2$OH group and one —NRH group, a diamine having two —NRH groups, or a mixture thereof, wherein each R is an H atom or a 1-4 carbon alkyl group.

7. A linear, water dissipatable polyester of
(1) at least one dicarboxylic acid,
(2) at least one glycol, at least 85 mole percent of which is a polyoxyethylene glycol having a molecular weight of about 100 to about 1000, and
(3) from 8 to 20 mole percent of an organic compound having the structural formula:

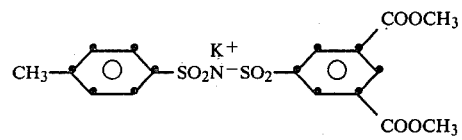

said polyester having an intrinsic viscosity of at least 0.1 as measured in a 60/40 mixture of phenol-tetrachloroethane.

8. A linear, water dissipatable polyester of
(1) at least one dicarboxylic acid,
(2) at least one glycol, at least 85 mole percent of which is a polyoxyethylene glycol having a molecular weight of about 100 to about 1000, and
(3) from 8 to 20 mole percent of an organic compound having the structural formula

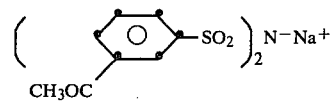

said polyester having an intrinsic viscosity of at least 0.1 as measured in a 60/40 mixture of phenol-tetrachloroethane.

9. An aqueous solution of the polyester defined in claim 1.
10. An aqueous solution of the polyester defined in claim 2.
11. An aqueous solution of the polyester defined in claim 3.
12. An aqueous solution of the polyester defined in claim 4.
13. An aqueous solution of the polyester defined in claim 5.
14. An aqueous solution of the polyester defined in claim 6.
15. An aqueous solution of the polyester defined in claim 7.
16. An aqueous solution of the polyester defined in claim 8.

17. The method for preparing a linear, water-dissipatable polyester containing a disulfonamido compound of the structural formula

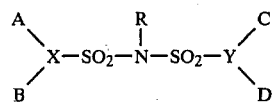

wherein
(a) R is selected from the group consisting of —H, an alkali metal, a divalent metal, and a nitrogen based cation.
(b) X and Y are the same or different radicals selected from the group consisting of divalent and trivalent arylene radicals of 6 to 12 carbons and divalent and trivalent alkarylene radicals of 7 to about 18 carbons, said radicals being unsubstituted and substituted with chlorine atoms, and
(c) A, B, C and D are the same or different and are selected from the group consisting of $$-H, -\overset{|}{C}OOR'' \text{ and } R_1\overset{|}{C}HR_1$$

wherein

R'' is selected from the group consisting of —H, alkyl of from 1 to about 8 and aryl of from 6 to about 14 carbons, $R_1$ is alkyl of from 1 to about 8 carbons, and either two or three of A, B, C and D are —H, which comprises forming said polyester containing a disulfonamido compound of the structural formula

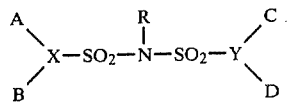

wherein (a) R is an alkali metal and X, Y, A, B, C and D are the same as described above, and subsequently replacing said alkali metal cation with a nitrogen based cation by subjecting said disulfonamido compound to the action of an ion exchange resin, molecular filtration or ultrafiltration.

* * * * *

UNITED STATES PATENT AND TRADEMARK OFFICE
CERTIFICATE OF CORRECTION

PATENT NO. : 4,304,900

DATED : December 8, 1981

INVENTOR(S) : George J. O'Neill

It is certified that error appears in the above—identified patent and that said Letters Patent is hereby corrected as shown below:

Column 10, line 64, after "unsubstituted", change "and" to ---or---.

Column 11, line 9, after "8" insert ---carbons---.

Signed and Sealed this

Thirteenth Day of April 1982

[SEAL]

Attest:

Attesting Officer

GERALD J. MOSSINGHOFF

Commissioner of Patents and Trademarks